United States Patent [19]

Onodera et al.

[11] Patent Number: 4,614,999

[45] Date of Patent: Sep. 30, 1986

[54] HIGH VOLTAGE PULSED POWER SUPPLY WITH TIME LIMITING NONLINEAR FEEDBACK

[75] Inventors: Toshihiro Onodera, Tokyo; Shigeru Tanaka; Sunao Matsumoto, both of Tochigi, all of Japan

[73] Assignee: Kabushiki Kaisha Toshiba, Tokyo, Japan

[21] Appl. No.: 656,726

[22] Filed: Oct. 1, 1984

[30] Foreign Application Priority Data

Sep. 29, 1983 [JP] Japan ................................ 58-181263

[51] Int. Cl.[4] ................................ H02M 3/315

[52] U.S. Cl. ................................ 363/28; 363/49; 378/106; 378/110; 378/112

[58] Field of Search ........................ 363/17, 27, 28, 49; 378/101, 106, 110, 112

[56] References Cited

U.S. PATENT DOCUMENTS 4,301,398 11/1981 Johnson ................................ 363/28
4,477,868 10/1984 Steigerwald ........................ 363/28
4,504,895 3/1985 Steigerwald ........................ 378/112

FOREIGN PATENT DOCUMENTS 1300882 7/1962 France ................................ 363/28

*Primary Examiner*—William H. Beha, Jr.
*Attorney, Agent, or Firm*—Banner, Birch, McKie & Beckett

[57] ABSTRACT

An apparatus for supplying high voltage pulsed direct current to an X-ray tube includes a transformer, a high frequency inverter circuit and a nonlinear feedback loop. The invention uses the high frequency inverter connected in series with a DC power supply source and the primary winding of the transformer in order to generate high voltage, high frequency AC in the secondary winding. A rectifier connected to the secondary winding supplies high voltage pulsed DC to the X-ray tube. A detector, such as a voltage divider, detects the voltage supplied to the X-ray tube and supplies a representation of it to a nonlinear feedback circuit connected between the detector and the high frequency inverter. The inverter circuit includes at least one switch generated by electrical pulses. The nonlinear feedback circuit controls the duty cycle of the inverter during only a portion of the output voltage range of the high voltage pulsed power supply, preferably only after the output voltage reaches 90% of the rated high voltage to be supplied to the X-ray tube.

11 Claims, 7 Drawing Figures

HIGH VOLTAGE PULSED POWER SUPPLY WITH TIME LIMITING NONLINEAR FEEDBACK

BACKGROUND OF THE INVENTION

X-ray devices such as CT (computerized tomography) scanners require a power supply capable of delivering to the X-ray tube pulses of DC power that have a short rise time, a high pulse repetition rate (PRR), and high stability (fairly constant peak voltage). A typical requirement is a 120 kV, 300 mA pulse with a 1 ms rise time. The fast rise time is necessary to prevent the damage to living tissue caused by soft X-rays generated as the voltage rises to its peak value. A 10 ms rise time, for example, is unacceptable. Ordinarily, a high voltage tetrode is used for switching the high voltage supply to produce pulses with the required characteristics. Although the high voltage tetrode is capable of producing pulses with a 0.2 ms rise time it suffers from the typical short service life of all vacuum tubes. The high voltage tetrode is also very expensive and requires a large driving circuit.

Another difficulty with conventional high voltage pulsed power supplies has to do with the commercial power source from which the high voltage supply draws its energy. Ordinary power frequencies of 50 or 60 Hz do not permit a high voltage power supply to produce a pulse with a rise time of less than 10 ms. Therefore, it has been proposed that the high voltage power supply include a transformer, in the primary winding of which is a high frequency inverter operating at about 10 kHz. This arrangement, however, has its own set of problems. An X-ray CT scanner requires a pulse whose peak value varies by no more than 1 percent in order to obtain acceptable image quality. Generally, however, the 1 percent maximum variation requirement is not met, for two reasons. First, DC power obtained from a commercial power source and used to drive the high frequency inverter usually includes a ripple component at twice the commercial power supply frequency. Second, the supply voltage gradually drops during the course of operating the X-ray tube.

To solve these problems, it has been suggested that the output of the high voltage pulsed power supply be controlled using negative feedback. Although this control method produces pulses with a fast rise time, it generates over-shoots which damage the X-ray tube.

In other technical fields, such as high speed operation of high capacity motors or brake control, a control method known as the bang-bang control method is used with the automatic control system. In this method, the feedback path is opened or closed by means of a switch. However, the timing of switch operation is so critical that a computer is generally required so as to minimize the evaluation function. Also, the necessary calculations require too much time for this method to be practically applied to control of an X-ray tube.

SUMMARY OF THE INVENTION

An object of the present invention is to supply an X-ray emitting device with high voltage pulses that have high stability and a high PRR.

Another object of the invention is to produce such high voltage pulse with a fast rise time.

The invention uses a high frequency inverter connected in series with a DC power supply source and the primary winding of a transformer in order to generate high voltage, high frequency AC in the secondary winding. A rectifier connected to the secondary winding supplies high voltage pulsed DC to the X-ray tube. A detector, such as a voltage divider, detects the voltage supplied to the X-ray tube and supplies a representation of it to a nonlinear feedback circuit connected between the detector and the high frequency inverter. The inverter circuit includes at least one switch operated by electrical pulses and a pulse generator which supplies the electrical pulses, or trigger signals, preferably at about 10 kHz, to the switch. The nonlinear feedback circuit controls the duty cycle of the inverter during only a portion of the output voltage range of the high voltage pulsed power supply, preferably only after the output voltage reaches 90% of the rated high voltage to be supplied to the X-ray tube. In this manner, overshoots are prevented; and changes in high voltage due to ripples in the commercial power supply are avoided.

DETAILED DESCRIPTION OF THE PREFERRED EMBODIMENT

Figure 1:
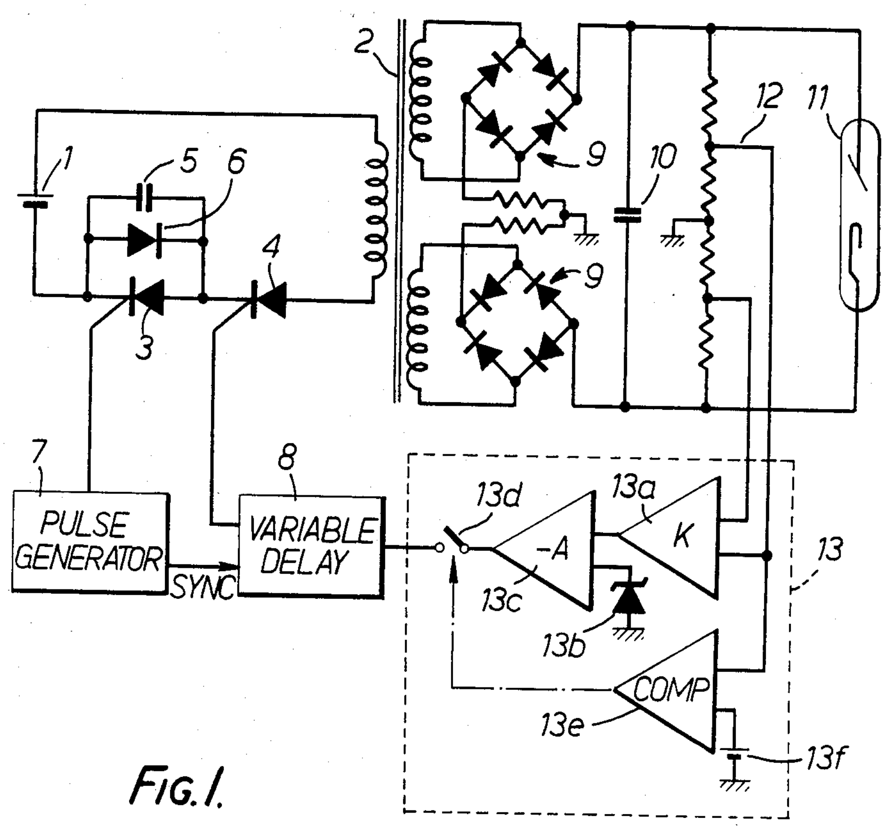
FIG. 1 is a schematic diagram of the preferred embodiment of the high voltage pulsed power supply.
Figure 3:
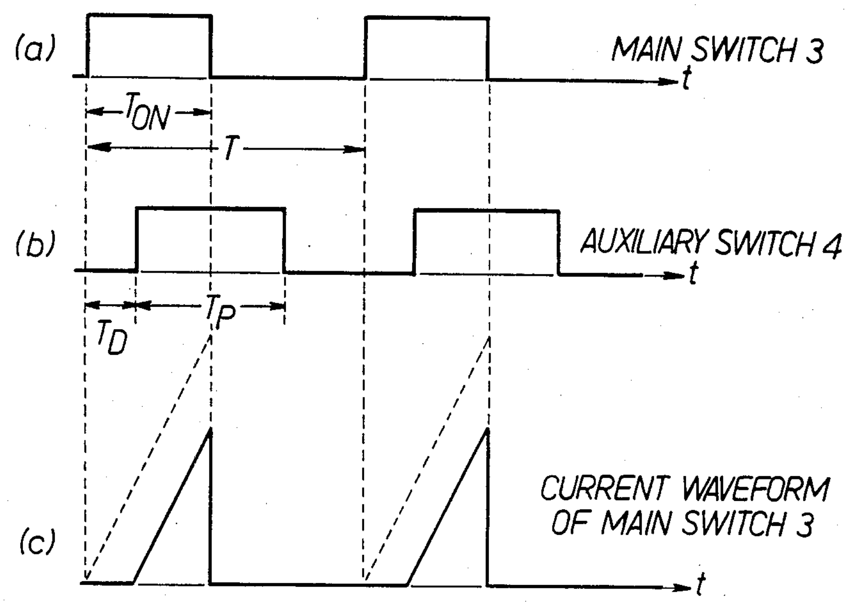
FIGS. 3*a–c* illustrate wave forms occuring in the transformer primary circuit of FIG. 1.

Referring to FIG. 1, there is provided a DC power supply source 1 where a DC voltage is obtained by well-known diode rectifier (not shown) rectifying the voltage of a commercial power supply source. Transformer 2 has a primary winding and a secondary winding. One of the terminals of the DC power supply source 1 is directly connected with one of the terminals of the primary winding. A high frequency inverter circuit is coupled between the other terminal of the DC power supply source 1 and the other terminal of the primary winding of transformer 2. The high frequency inverter circuit includes a main switch 3 consisting of, for example, a GTO (gate-turn-off) thyristor, an auxiliary switch 4 consisting of a thyristor in series with the main switch 3, a resonant capacitor 5 in parallel with the main switch 3, a dumper diode 6 connected across main switch 3 and capacitor 5, a pulse generator 7 and a variable delay circuit 8 used as an auxiliary pulse generator. This inverter circuit according to the preferred embodiment may also be described as a voltage resonant type switching system. The pulse generator 7 supplies to the main switch 3 pulse signals whose waveform is shown in FIG. 3(*a*). The pulse signals have a uniform repetition period T, for example $10^{-4}$ s (corresponding) to a frequency of 10 kHz) with a conductive period Ton during which the main switch 3 becomes conductive. The variable delay circuit 8 supplies pulses to the auxiliary switch 4; the waveform of these pulses is shown in FIG. 3(*b*). Each pulse from delay circuit 8 lags the corresponding pulse from pulse generator 7 by a delay time Td.

Figure 2:
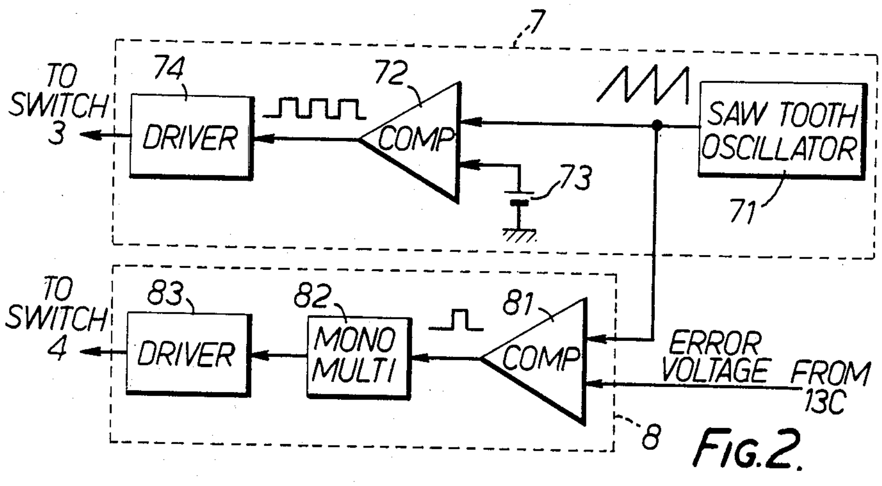
FIG. 2 is a block diagram of the pulse generator and the variable delay circuit shown in FIG. 1.

FIG. 2 shows an example of the pulse generator 7 and the variable delay circuit 8 in FIG. 1. The pulse generator 7 has a saw tooth oscillator 71, whose output is supplied to a comparator 72. The comparator 72 compares the output of the oscillator 71 with a reference voltage 73 so as to output pulses having a constant duty cycle (Ton/T). The output pulses are supplied to the main switch 3 through a driver 74. The variable delay circuit 8 includes a comparator 81. The output of oscillator 71 is supplied to the comparator 81 as a synchronizing signal with an error voltage being obtained by a feedback circuit 13 hereinafter described. The phase of the output of the comparator 81 varies in accordance with the error voltage, causing the delay time Td to vary. The output of the comparator 81 is supplied to a monostable multivibrator 82 which determines pulse width Tp. The output pulse of monostable multivibrator 82 is supplied to the auxiliary switch 4 through a driver 83.

A pair of full wave bridge rectifiers 9, 9 connected to the transformer secondary winding is provided for rectifying the high voltage induced in the secondary winding in response to the operation of the high frequency inverter circuit. The output of rectifiers 9, 9 is filtered by capacitor 10 and then supplied to X-ray tube 11.

The high voltage being supplied to the X-ray tube 11 is detected by voltage divider 12 and then fed back, by feedback circuit 13, to delay circuit 8. Feedback circuit 13 is a negative feedback loop comprising a coefficient circuit 13*a*, a Zener diode 13*b*, an error amplifier 13*c*, a switch 13*d* and a comparator 13*e*. The coefficient circuit 13*a* consists of an operational amplifier to receive the detected voltage from voltage divider 12 and to amplify it by a predetermined coefficient K. Both the output of the coefficient circuit 13*a*, and a reference voltage regulated by the Zener diode 13*b*, are supplied to the error amplifier 13*c* (also an operational amplifier). The error amplifier 13*c* outputs an error voltage representing the difference between the reference voltage and the output of the coefficient circuit 13*a*. This error voltage is supplied to delay circuit 8 as a delay time control signal when the switch 13*d* is ON. The switch 13*d* and the comparator 13*e* combine to operate the negative feedback loop in a nonlinear fashion. The comparator 13*e* compares the detected voltage with a standard voltage 13*f* whose magnitude corresponds to 90% of the rated or target voltage of the X-ray tube 11 and outputs a control signal to the switch 13*d* when the detected voltage is higher than the standard voltage. The switch is OFF whenever the detected voltage is less than the standard voltage, so that the negative feedback loop is open. When the supply voltage to the X-ray tube 11 reaches 90% of the target voltage, comparator 13*e* outputs the control signal and switch 13*d* turns ON, closing the negative feedback loop.

The error voltage from error amplifier 13*c* is used for controlling the length of the delay time Td. When the detected voltage is less than the reference voltage, delay circuit 8 shortens the delay time Td in response to the error voltage. Delay time Td is lengthened when the detected voltage is greater than the reference voltage.

The auxiliary switch 4 is used for changing the duty cycle of power supplied by the high frequency inverter circuit. Auxiliary switch 4 effectively prevents capacitor 5 from recharging by a resonant current induced in the inverter circuit according to the switching operation of main switch 3. Further it maintains the resonant condition of the high frequency inverter circuit at the same time. Thus, it is possible for the inverter circuit to change the amount of power, and therefore, the voltage supplied to the X-ray tube, only by changing the conductive timing (i.e., the delay time Td) of the auxiliary switch 4 in regard to that of the main switch 3.

Referring to FIG. 3, main switch 3 is controlled by the waveform (a) and switched ON during time Ton with a uniform pulse repetition period T. Auxiliary switch 4 is controlled by the waveform (b) and switched ON at time Td after the beginning of period Ton. Current flowing in the inverter circuit (the transformer primary circuit) is shown by the waveform (c). The longer the delay time Td, the smaller the amount of the current (and power). When the delay time Td equals zero, the inverter circuit is able to supply the maximum power, indicated by the dashed-line triangle of waveform (c).

This negative feedback loop keeps the supply voltage stable by changing delay time Td in response to the detected voltage. An important feature of the preferred embodiment is that the negative feedback loop becomes operative (closed) only when the output voltage from the power supply reaches ±10% of the rated voltage; thus, the power supply is controlled by nonlinear feedback in response to the detected voltage. Such nonlinear feedback makes it possible to rapidly approach the target voltage.

On the contrary, if the feedback loop were constantly closed, an excess error voltage would be supplied to the delay circuit at the beginning of the rising portion of the voltage, causing excess power to be supplied to the X-ray tube 11. When the output voltage approached the target voltage, so that the error voltage was small, the system could not rapidly respond and the inverter circuit would supply excess power to the load due to the delay caused by smoothing capacitor 10 and the closed loop system. As a result, the output voltage would overshoot the target. After that, the power is decreased in order to suppress the overshoot, but the voltage would gradually approach the target voltage with damped oscillations according to the delay characteristic. Therefore, it would take a long time for the output voltage to stabilize. In the preferred embodiment, however, the negative feedback loop operates only when the output voltage approaches the target voltage, so that the output voltage stabilizes rapidly without overshooting. Thus, the waveform of the output voltage rises quickly to a stable level.

Figure 4:
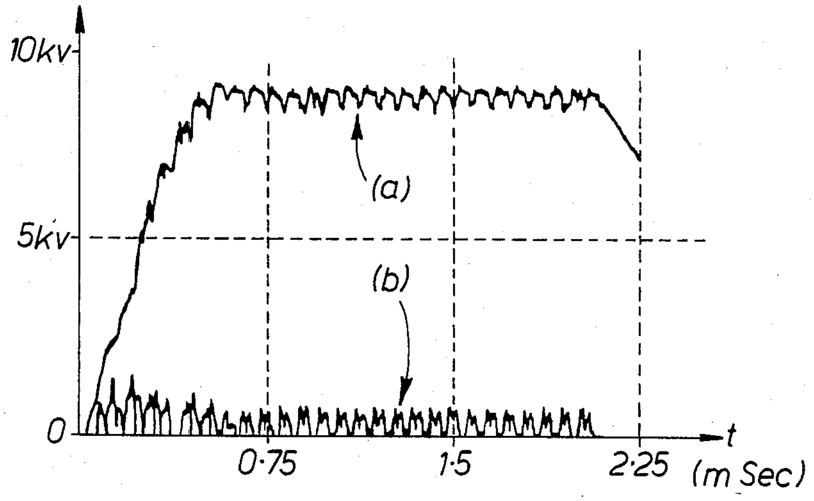
FIG. 4 is a graph comparing inverter voltage with the output voltage of the pulsed power supply circuit during a high voltage pulse.

FIG. 4 shows an example of the waveform of the output voltage. It takes about 0.5 ms to rise without any overshooting. The noise components in FIG. 4 (the small amplitude, high frequency vibrations) are detected by the waveform measuring apparatus and correspond to the switching frequency (about 10 kHz) of the high frequency inverter circuit. Curve (a) represents the pulsed, high voltage direct current; while curve (b) represents this noise.

Figure 5:
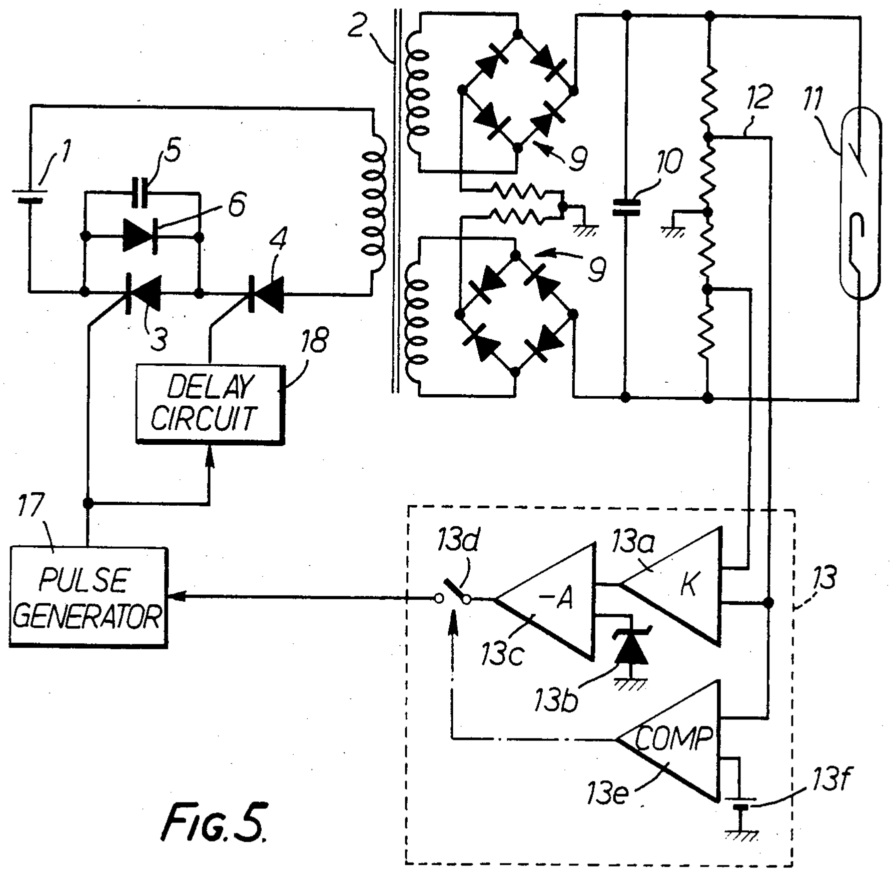
FIG. 5 is a block diagram of another embodiment of the invention.

FIG. 5 shows another embodiment of the invention. In this embodiment, delay time Td is fixed at Tdf; the conductive period (pulse width) Ton is changed in accordance with the error voltage from error amplifier 13*c*. A constant delay circuit 18 supplies to auxiliary switch 4 pulses having a fixed delay time Tfa following the pulse signals of the main switch 3. The constant delay circuit 18 may, for example, be a monostable multivibrator. Pulse generator 17 generates pulse signals, such as the waveform (a) in FIG. 3, whose pulse width Ton varies in response to the error voltage supplied from the feedback circuit 13. This may be done, for example, by supplying the error voltage instead of the reference voltage 73 to the comparator 72 in FIG. 2.

Similarly, it is also possible to change the pulse repetition period T of the trigger signals, keeping the pulse width Ton fixed, for example by using a voltage-to-frequency converter as a part of the saw tooth oscillator 71 in FIG. 2.

Figure 6:
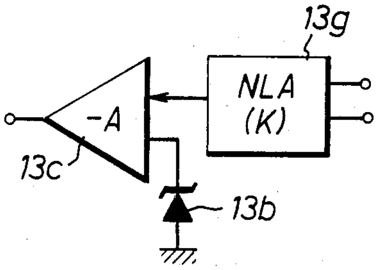
FIG. 6 is a block diagram of another embodiment of the feedback circuit in FIGS. 1 and 5.
Figure 7:
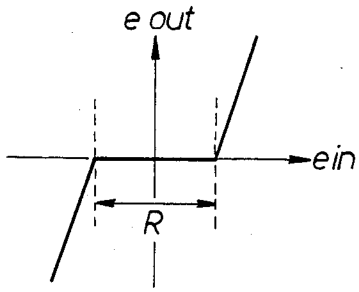
FIG. 7 is a graph of the transfer function of the nonlinear amplifier of FIG. 6.

Feedback circuit 13 may be replaced by the circuit shown in FIG. 6 which uses a nonlinear amplifier 13*g* that has the nonlinear transfer characteristic shown in FIG. 7. This characteristic includes a non-sensitive region R. When the circuit shown in FIG. 6 is used, there is no need for switch 13*d* or comparator 13*e*, to achieve nonlinear negative feedback.

Although illustrative embodiments of the present invention have been described in detail with reference to the accompanying drawings, it is to be understood that the invention is not limited to those precise embodiments and that various changes and modifications may be effected therein by one skilled in the art without departing from the scope or spirit of the invention.

We claim:

1. A high voltage pulsed direct current power supply for an X-ray rube, comprising:

a step-up transformer having a primary winding and a secondary winding;

a primary circuit including in series a source of direct current, the transformer primary winding, and switching means operable by electrical pulses for interrupting the direct current and inducing a high voltage alternating current in said secondary winding, said switching means including pulse generating means for periodically generating the electrical pulses at a high frequency;

a secondary circuit including in series the transformer secondary winding and rectifying means for converting the high voltage alternating current to high voltage direct current; and nonlinear feedback means coupled between said rectifying means and said pulse generating means for controlling the generation of the electrical pulses in accordance with the high voltage direct current, said nonlinear feedback means including a loop switch to close when the high voltage direct current is greater than a predetermined voltage.

2. The power supply of claim 1 wherein the width of the electrical pulses is variable.

3. The power supply of claim 1 wherein the repetition frequency of the pulses in variable.

4. Apparatus for supplying high voltage direct current to an X-ray emitting device, comprising:

a high frequency inverter connectable to a source of direct current, said inverter including switching means for interrupting the direct current at a high frequency to produce high frequency alternating current;

a transformer connected to said inverter to increase the voltage of the high frequency alternating current;

rectifying means connected to said transformer for converting the increased voltage alternating current to high voltage direct current; and nonlinear feedback means for controlling the operation of said switching means comprising detecting means to detect the high voltage direct current, an error amplifier to generate an error signal in response to the detected high voltage direct current, loop switching means for supplying the error signal to said high frequency inverter when said loop switching means is closed and for denying the error signal to said high frequency inverter when said loop switching means is open, and means for closing said loop switching means when the detected high voltage direct current is greater than a predetermined voltage.

5. The apparatus of claim 4 wherein said detecting means comprises a voltage divider.

6. The apparatus of claim 5 wherein said switching means includes a main switch actuated periodically at a predetermined rate and an auxiliary switch actuated periodically at the predetermined rate but delayed in time from the actuations of said main switch, said nonlinear feedback means controlling the amount of the delay.

7. The apparatus of claim 5 wherein said nonlinear feedback means includes a nonlinear amplifier.

8. The apparatus of claim 5 wherein said high frequency inverter includes:

a main switch actuable by electrical pulses and connected in series with the source of direct current;

a capacitor connected in parallel with said main switch;

a diode connected in parallel with said capacitor;

an auxiliary switch actuable by electrical pulses and connected in series with said main switch and the source of direct current;

a pulse generator to periodically supply the electrical pulses to said main switch; and a delay circuit connected between said pulse generator and said auxiliary switch to periodically supply the electrical pulses to said auxiliary switch following a delay.

9. The apparatus of claim 8 wherein said nonlinear feedback means controls the amount of the delay.

10. The apparatus of claim 8 wherein said nonlinear feedback means controls the width of the electrical pulses from said pulse generator.

11. The apparatus of claim 8 wherein said nonlinear feedback means controls the repetition frequency of the electrical pulses from said pulse generator.

* * * * *